(12) United States Patent
Liu et al.

(10) Patent No.: US 11,954,950 B2
(45) Date of Patent: Apr. 9, 2024

(54) INFORMATION INTERACTION METHOD AND INFORMATION INTERACTION SYSTEM

(71) Applicant: Ford Global Technologies, LLC, Dearborn, MI (US)

(72) Inventors: Hailan Liu, Nanjing (CN); Xiaojing Zhang, Nanjing (CN); Sheena Meng, Shanghai (CN)

(73) Assignee: Ford Global Technologies, LLC, Dearborn, MI (US)

(*) Notice: Subject to any disclaimer, the term of this patent is extended or adjusted under 35 U.S.C. 154(b) by 198 days.

(21) Appl. No.: 17/479,644

(22) Filed: Sep. 20, 2021

(65) Prior Publication Data
US 2022/0092889 A1    Mar. 24, 2022

(30) Foreign Application Priority Data
Sep. 21, 2020 (CN) .......................... 202010994211.7

(51) Int. Cl.
*G07C 5/00* (2006.01)
*B60W 40/09* (2012.01)

(52) U.S. Cl.
CPC .............. *G07C 5/008* (2013.01); *B60W 40/09* (2013.01); *B60W 2420/403* (2013.01)

(58) Field of Classification Search
CPC ... G07C 5/008; B60W 40/09; B60W 2420/42; B60W 50/08; H04L 67/12
USPC ...................................................... 701/31.4
See application file for complete search history.

(56) References Cited

U.S. PATENT DOCUMENTS

| | | | |
|---|---|---|---|
| 7,924,146 B2 | 4/2011 | Seder et al. | |
| 10,222,228 B1* | 3/2019 | Chan ..................... | G06F 3/0481 |
| 11,682,357 B1* | 6/2023 | Seo ........................ | G09G 3/342 |
| | | | 345/694 |
| 2013/0030645 A1 | 1/2013 | Divine et al. | |
| 2014/0309806 A1* | 10/2014 | Ricci ................... | H04W 12/088 |
| | | | 701/1 |
| 2015/0352953 A1* | 12/2015 | Koravadi ............... | B60K 37/06 |
| | | | 701/36 |
| 2017/0300053 A1* | 10/2017 | Wengreen ............ | G05D 1/0088 |
| 2018/0035704 A1 | 2/2018 | Wicking et al. | |
| 2018/0122313 A1* | 5/2018 | Mizusako ............. | G09G 3/3607 |
| 2020/0210726 A1* | 7/2020 | Yang ...................... | G06V 10/82 |

* cited by examiner

*Primary Examiner* — Tyler D Paige
(74) *Attorney, Agent, or Firm* — Brandon Hicks; Eversheds Sutherland (US) LLP (57) ABSTRACT

An information interaction system for a vehicle is provided. The information interaction system comprises: an information processing device including a processor and a memory storing instructions executable by the processor, that, when executed by the processor, cause the latter to perform steps comprising: providing a first customization option for a user to set a first trigger condition and a corresponding first customized content; detecting whether the first trigger condition is met by a vehicle computer; and when the first trigger condition is met, running the first customized content by the vehicle computer.

17 Claims, 5 Drawing Sheets

INFORMATION INTERACTION METHOD AND INFORMATION INTERACTION SYSTEM

CROSS-REFERENCE TO RELATED APPLICATIONS

The present disclosure claims priority to and the benefit of Chinese patent application No. 2020109942117, filed Sep. 21, 2020, which is hereby incorporated by reference herein in its entirety.

FIELD

The present disclosure generally relates to vehicle technology field, and more particularly to an information interaction method and an information interaction system.

BACKGROUND

With the development of technology and continuous changes in user needs, more and more modern vehicles are equipped with more and more auxiliary infotainment system options, and allow more diverse interactive applications for drivers and passengers. Many vehicle computers also include a human-machine interface (HMI), which allows the vehicles to communicate with humans. This may include, but not limited to, touch-selectable input or display and/or audio output and input. These settings provide options for effective interaction between the drivers and the vehicles, driving assistance, and entertainment functions.

However, the functions provided by the existing vehicle computing systems are mostly reflected in a relatively fixed interaction mode between the drivers or occupants and the vehicles. Inventors of the present disclosure recognize that there is a possibility of further developing more customized content in the existing technology. In particular, the inventors of the present disclosure recognize that under the premise of safety, specific content can be pre-customized among for example different family members through the vehicle computing system to further explore the possibility of enriching driving experience and life experience.

SUMMARY

According to one aspect of the present disclosure, an information interaction system for a vehicle is provided, which comprises: an information processing device including a processor and a memory, the memory storing instructions executable by the processor, that, when executed by the processor, cause the latter to perform steps comprising: providing a first customization option for a user to set a first trigger condition and a corresponding first customized content; detecting whether the first trigger condition is met by a vehicle computer; and when the first trigger condition is met, running the first customized content by the vehicle computer.

According to an embodiment of the present disclosure, wherein providing the first customization option comprises allowing the user to set the first customization option on any one of a mobile device, a cloud, and the vehicle computer.

According to an embodiment of the present disclosure, wherein the steps includes providing the first customization option by the vehicle computer, receiving user input directly and caching the first customized content and the first trigger condition by the vehicle computer.

According to an embodiment of the present disclosure, wherein the steps includes providing the first customization option by the mobile device, and receiving and caching both the first customized content and the first trigger condition from the cloud or directly from the mobile device by the user through the vehicle computer.

According to an embodiment of the present disclosure, wherein the step of detecting whether the first trigger condition is met comprises: detecting the first trigger condition by the vehicle computer first, and when the first trigger condition is met, obtaining the first customized content by the vehicle computer from at least one of the mobile device and the cloud that communicate with the vehicle computer, and presenting the first customized content at the vehicle computer.

According to an embodiment of the present disclosure, wherein the first trigger condition includes one or more of time, place, keywords, object characteristics, and environmental characteristics.

According to an embodiment of the present disclosure, wherein the first customized content includes one or more of text, audio, picture, video, smell, light, augmented reality projection, temperature, humidity, and vibration.

According to an embodiment of the present disclosure, wherein the first trigger condition is place and the information processing device is configured to communicate with a vehicle positioning system to detect whether the place has reached.

According to an embodiment of the present disclosure, wherein the first trigger condition includes object characteristics and the information processing device is configured to receive signals from vehicle sensors, and detect one or more of electronic devices paired with or communicated with the vehicle and user input to confirm whether the object characteristics are met.

According to an embodiment of the present disclosure, wherein running the first customized content includes calling a vehicle computer application program, and presenting a message in the current users field of vision in a superimposed manner by means of augmented reality.

According to an embodiment of the present disclosure, wherein the steps comprises further asking the user to confirm whether to run the first customized content before running the first customized content.

According to an embodiment of the present disclosure, wherein the steps comprises further confirming whether the first customized content belongs to a pre-set category message configured to run automatically before running the first customized content.

According to an embodiment of the present disclosure, wherein the steps comprises further confirming whether an object targeted by the first customized content is in a driving position before running the first customized content, and when the object is in the driving position, confirming whether presenting at this time meets safe driving conditions.

According to another aspect of the present disclosure, an information interaction method for a vehicle is provided, which comprises the following steps: providing a first customization option for a user to set a first trigger condition and a corresponding first customized content; detecting whether the first trigger condition is met by a vehicle computer; and when the first trigger condition is met, triggering the first customized content.

According to an embodiment of the present disclosure, wherein the first trigger condition includes one or more of time, place, keywords, object characteristics, and environmental characteristics.

According to an embodiment of the present disclosure, wherein the first customized content includes one or more of text, audio, picture, video, smell, light, augmented reality projection, temperature, humidity, and vibration.

According to an embodiment of the present disclosure, wherein the method comprises customizing the first information and providing the first trigger condition by the vehicle computer, a mobile device and a cloud that communicate with the vehicle computer.

According to an embodiment of the present disclosure, wherein the first trigger condition includes at least object characteristics, and the information processing device receives signals from vehicle sensors and/or user input to confirm whether the object characteristics are met.

According to an embodiment of the present disclosure, wherein the steps includes receiving and caching both the first customized content and the first trigger condition by the vehicle computer.

According to another aspect of the present disclosure, an information interaction system for a vehicle is provided, which comprises: an information processing device including a processor and a memory, the memory storing instructions executable by the processor, that, when executed by the processor, cause the latter to perform steps comprising: providing a first customization option for a user to set a first trigger condition and a corresponding first customized content by a vehicle computer; the first trigger condition includes at least object characteristics for a specific object, time and place; detecting whether the first trigger condition is met by the vehicle computer; and when the first trigger condition is met, running the first customized content to the specific object at the time and the place by the vehicle computer.

BRIEF DESCRIPTION OF THE DRAWINGS

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like referenced numerals refer to like parts throughout the different figures.

DETAILED DESCRIPTION

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present disclosure in various ways. As those of ordinary skill in the art will understand, the various features shown and described with reference to any one drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

In the present disclosure, relational terms, such as first and second, etc., are only used to distinguish one entity or action from another entity or action, and do not necessarily require or imply any actual relationship or order between such entities or actions. The term "comprise" or any other variation thereof is intended to cover non-exclusive inclusion, so that a process, method, article or device comprising a series of elements does not only include these elements, but may also include unclearly listed or other elements inherent in such processes, methods, article or device. In the absence of more constraints, the element with "comprise" in front of it does not exclude the existence of other identical elements in the process, method, article, or device that includes the element.

As used herein, the term "and/or" when used to list two or more items means that any one of the listed items can be used by itself, or any combination of two or more of the listed items can be used.

As mentioned in the background above, existing vehicles have provided an interface that allows the vehicles to interact with people and have provided abundant infotainment system options. However, the functions provided by the existing vehicle computer systems are mostly reflected in the relatively fixed interaction mode between the drivers or occupants and the vehicles. The inventors of the present disclosure recognize that there is also the possibility of further providing customized services. Under the premise of safety, by providing selectable customization options, specific content can be pre-customized among for example different family members through the vehicle computing system, which helps to further explore the possibility of enriching driving experience and life experience. By providing a personalized and customizable information interaction system, more diversified driving needs and social needs can be met. Especially in the busy society, the time and opportunities for communication between friends and family members are limited by time. Certain festivals and commemorative places may also be ignored due to the busy life and work. By providing a selectable personalized customization platform for the vehicle, it is allowed to record meaningful events between family members and friends, and by setting up exclusive customized "surprise messages", that is triggered to be presented in a specific scenario, car fun and life fun is added.

In the following, one or more embodiments of the present disclosure will be described with reference to the accompanying drawings. The flowchart describes the process performed by the system. It can be understood that the execution of the flowchart does not need to be performed in sequence, one or more steps can be omitted, one or more steps can also be added, and one or more steps can be performed in sequence or in a reverse order, and even in some embodiments, one or more steps can be performed simultaneously.

The motor vehicles involved in the following embodiments may be standard gasoline-powered vehicles, hybrid vehicles, electric vehicles, fuel cell vehicles and/or any other types of vehicles, and may also be buses, ships, or aircraft. The vehicle include components related to mobility, such as engine, electric motor, transmission, suspension, drive shaft, and/or wheels. The vehicle can be non-autonomous, semi-autonomous (for example, some conventional motion functions are controlled by the vehicle) or autonomous (for example, the motion functions are controlled by the vehicle without direct input from the driver).

Figure 1:
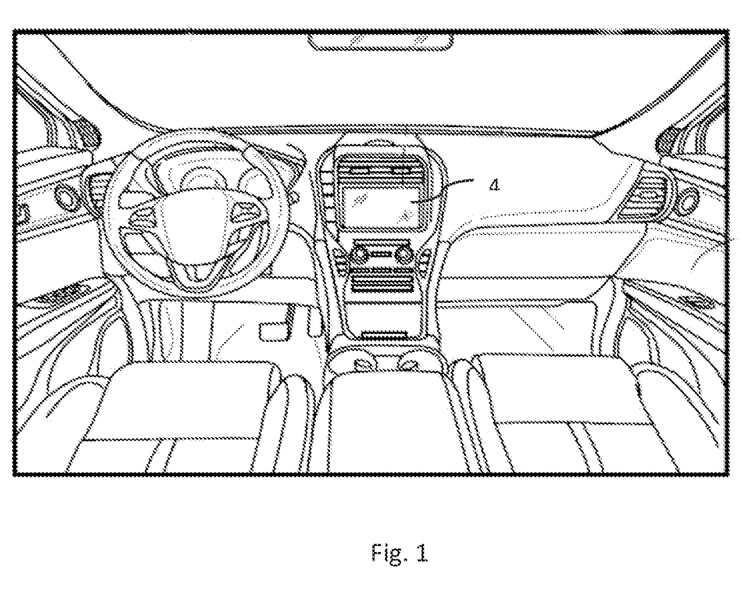
FIG. 1 shows a cabin of a motor vehicle according to an embodiment of the present disclosure.

FIG. 1 shows an exemplary hardware environment of a vehicle computer (also called a vehicle computing system (VCS)) 1 according to an embodiment of the present disclosure. An example of an operating system installed in the vehicle computing system 1 is the SYNC system manufactured by Ford Motor Company. A vehicle equipped with the vehicle computing system 1 may include a display 4 located in the vehicle, such as the display 4 shown in FIG. 1, which can be used to interact with one or more vehicle users, and can be used to receive input and present content. The number of the display 4 can be one or more, which individually or cooperate to present vehicle information or content that interacts with the vehicle—for example, the display of information related to the vehicle and the driving of the vehicle, and the display and interaction of various applications installed in the vehicle computing system. The type of display can include, for example, without limitation, CRT (Cathode Ray Tube) display, LCD (Liquid Crystal Display), LED (Light Emitting Diode) display, PDP (Plasma Display), laser display, VR (Virtual Reality) display, as well as HUD (Head Up) display, and various types of commercially available (including, for example, OLED-based) transparent displays provided by manufacturers such as Panasonic, Samsung, and Xiaomi. Among above, a transparent display screen of a suitable size can be used for HUD or superimposed on an inner side of the windshield or side windows. In addition, the transparent display screen itself can also be formed as a part of or the entire windshield or side windows. It can also be understood that the display can be located in any suitable position in the vehicle, such as, but not limited to, the center console, or the screen can also be virtually projected onto the side windows, windshield, or other suitable background of the vehicle.

Figure 2:
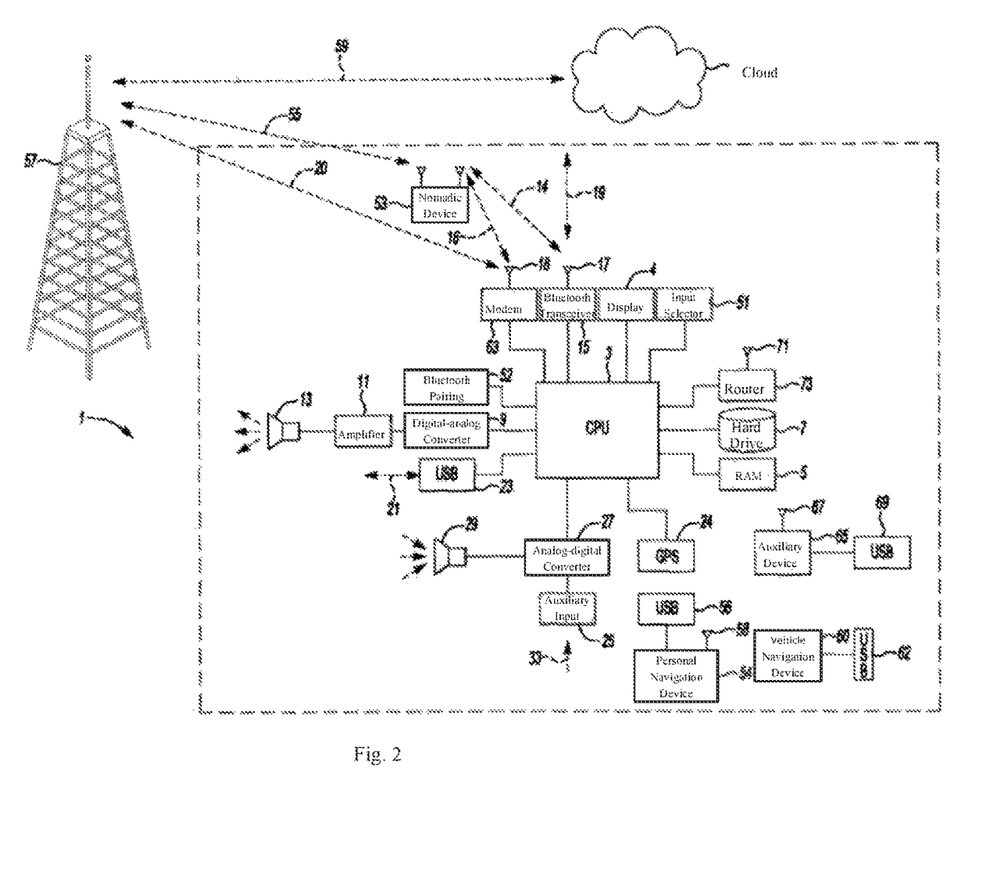
FIG. 2 shows an exemplary block topology of a vehicle computer system according to an embodiment of the present disclosure.

Continuing to refer to FIG. 1 in conjunction with FIG. 2, the vehicle computing system 1 has a processor (CPU) 3 for controlling at least a part of its own operation. The processor 3 can execute on-board processing instructions and programs, such as the processor-executable instructions described for the vehicle computing system 1 in the present disclosure. The processor 3 is connected to a non-persistent memory 5 and a persistent memory 7. The memories 5 and 7 may include volatile and non-volatile memories such as Read Only Memory (ROM), Random Access Memory (RAM) and Keep-Alive Memory (KAM), etc. The memories 5 and 7 can be implemented using any number of known storage devices (such as Programmable Read Only Memory (PROM), EPROM (Electrically Programmable Read-only Memory), EEPROM (Electrically Erasable Programmable Read Only Memory), Solid State Drives (SSD) (for example, based on RAM), Phase Change Memory (PCM), flash memory or any other electronic, magnetic, optical or combined storage devices capable of storing data). The memories 5 and 7 may store processor-executable instructions for the vehicle computing system 1.

The processor 3 is also provided with multiple different inputs to allow user to interact with the processor. In an illustrative embodiment, the inputs include a microphone 29 configured to receive audio signals, an auxiliary input 25 for the input 33 (eg CD (Compact Disc), tape, etc.), a USB (Universal Serial Bus) input 23, a GPS (Global Positioning System) input 24, and a Bluetooth input 15. An input selector 51 is also provided to allow the user to switch among various inputs. The input at a microphone and auxiliary connector can be converted from an analog signal to a digital signal by a converter 27 before being passed to the processor. In addition, although not shown, a plurality of vehicle components and auxiliary components that communicate with the vehicle computing system may transmit data to or receive data from the vehicle computing system 1 (or its components) via a vehicle network (such as but not limited to CAN (Controller Area Network) bus).

Additionally, the processor 3 may communicate with multiple vehicle sensors and drivers via input/output (I/O) interfaces which may be implemented as single integrated interfaces that provide multiple raw data or signal adjustment, processing and/or conversion, short-circuit protection, etc. Further, types of the sensors that communicate with the processor 3 may include, by way of example, but not limited to, cameras, ultrasonic sensors, pressure sensors, fuel level sensors, engine speed sensors, temperature sensors, photoplethysmography sensors, etc, to identify user interaction information such as button presses, audio, touch, text input, facial expressions or actions, hand gestures or actions, head gestures or actions, and body gestures or actions, as well as to identify vehicle information such as fuel level, powertrain system failure, temperature inside the vehicle, etc.

The output of the vehicle computing system 1 may include, but not limited to, the display 4, a speaker 13, and various actuators. The speaker 13 may be connected to an amplifier 11 and receive signal from the processor 3 via a digital-analog converter 9. The output of the system can also be output to a remote Bluetooth device (such as a personal navigation device 54) or a USB device (such as a vehicle navigation device 60) along bidirectional data streams indicated by 19 and 21, respectively.

In an illustrative embodiment, the vehicle computing system 1 communicates with a nomadic device 53 (eg, cellular phone, smart phone, personal digital assistant, etc.) of the user via an antenna 17 of a Bluetooth transceiver 15. The nomadic device 53 may in turn communicate 59 with the cloud 125 outside the vehicle 31 via, for example, a communication 55 with a cellular tower 57. In some embodiments, the cellular tower 57 may be a Wi-Fi (Wireless Local Area Network) access point. Signal 14 represents an exemplary communication between the nomadic device 53 and the Bluetooth transceiver 15. The pairing of the nomadic device 53 and the Bluetooth transceiver 15 can be instructed through a button 52 or similar input, thereby indicating to the processor 3 that the Bluetooth transceiver in the vehicle will be paired with a Bluetooth transceiver in the nomadic device.

Data can be transferred between the processor 3 and the cloud 125 via, for example, data-plan, data over voice, or Dual-Tone Multi-Frequency (DTMF) tones associated with the nomadic device 53. Alternatively, the vehicle computing system 1 may include an in-vehicle modem 63 with an antenna 18 to transfer 16 data between the processor 3 and the nomadic device 53 via a voice band. Subsequently, the nomadic device 53 can communicate 59 with the cloud 125 outside the vehicle 31 via, for example, the communication 55 with the cellular tower 57. In some embodiments, the modem 63 may directly establish a communication 20 with the cellular tower for further communication with the cloud 125. As a non-limiting example, the modem 63 may be a USB cellular modem and the communication 20 may be cellular communication.

In an illustrative embodiment, the processor is provided with an operating system including an API (Application Programming Interface) that communicates with modem application software. The modem application software may access an embedded module or firmware on the Bluetooth transceiver 15 to complete a wireless communication with a remote Bluetooth transceiver (for example, the Bluetooth transceiver in the nomadic device). The Bluetooth is a subset of an IEEE 802 PANS (Personal Area Networks) protocol. An IEEE 802 LAN (Local Area Network) protocol includes Wi-Fi and has a lot of cross-functionality with IEEE 802 PAN. Both of them are suitable for wireless communication in vehicles. Other communication methods can include free-space optical communication (for example, Infrared Data Association, IrDA) and non-standard consumer infrared (consumer IR) protocols, and so on.

In an embodiment, the nomadic device 53 may be a wireless Local Area Network (LAN) device capable of communicating via, for example, an 802.11 network (for example, Wi-Fi) or a WiMax (Worldwide Interoperability Microwave Access) network. Other sources that can interact with the vehicle include a personal navigation device 54 with, for example, a USB connection 56 and/or antenna 58, or a vehicle navigation device 60 with a USB 62 or other connection, a vehicle GPS device 24, or a remote navigation system (not shown) connected to the cloud 125.

In addition, the processor 3 can communicate with a number of other auxiliary devices 65. These devices can be connected to each other via wireless connections 67 or wired connections 69. Likewise or alternatively, the CPU may connect to a vehicle-based wireless router 73 via, for example, a Wi-Fi 71 transceiver. This may allow the CPU to connect to a remote network within the range of the local router 73. The auxiliary device 65 may include, but not limited to, a personal media player, a wireless health device, a mobile computer, and the like.

The exemplary processes and steps according to the present disclosure will be further described below in conjunction with the accompanying drawings. It should be understood that any described processes or steps in the described processes can be combined with other disclosed processes or steps to form one or more embodiments within the scope of the present disclosure. The exemplary structures and processes disclosed herein are intended to be illustrative and not restrictive.

Figure 3:
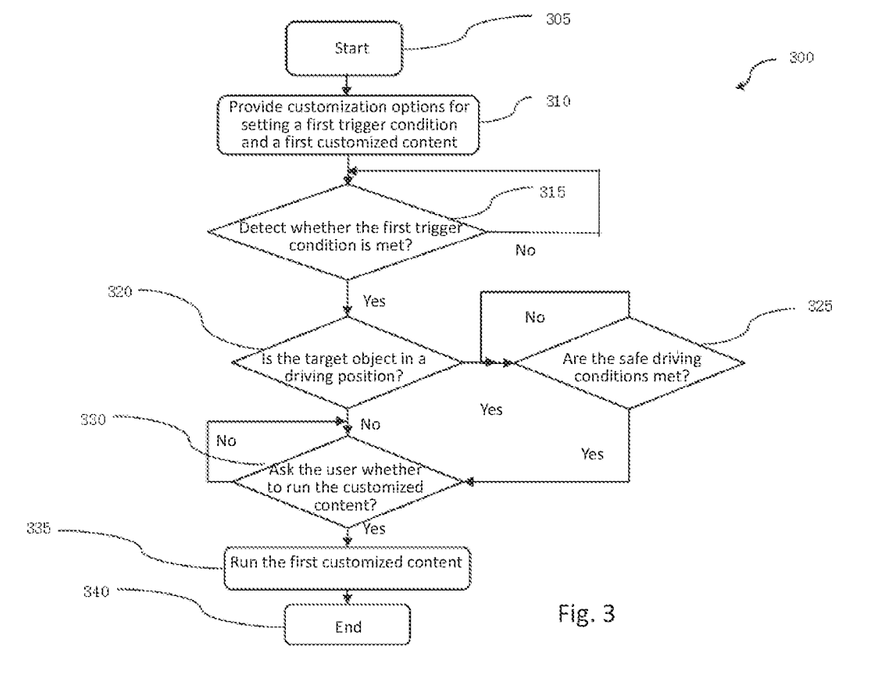
FIG. 3 shows a flowchart of a vehicle information interaction method according to an embodiment of the present disclosure.

In an embodiment, a flowchart of an interaction method according to an embodiment of the present disclosure is shown in FIG. 3, which shows a flowchart 300 of the interaction method according to a specific embodiment. In the flowchart 300, the method starts at 305. Next, at step 310, the user is provided with customization options for the user to choose from, so that the user may set a first customized content to be triggered or run under a first trigger condition.

In one or more embodiments, the first trigger condition includes one or more of time, place, keywords, object characteristics, and environmental characteristics. For example, the user can set a specific time, such as anniversaries. The user can set a place, for example, a place with special memorial significance. The user can also set object characteristics of target object (i.e. recipient of the first customized content), and then the object features are recognized to identify the specific target object. In other embodiments, the user can set specific keywords. The keywords may be, for example, a piece of pre-set voice password. In still other embodiments, the keywords may also be one or more characters that need to be manually input. In this case, satisfaction of the first trigger condition can be determined when the one or more characters are inputted in a user search box or other program interface. In addition, in one or more embodiments, environmental characteristics can also be added as trigger condition or trigger status. For example, the user can choose as follows: to trigger certain customized content only in rain and snow, or to trigger specific customized content above or below a certain temperature or humidity, or even to trigger certain customized content only when the complexity of the road conditions is above or below a predetermined level.

In one or more embodiments, the first customized content may include one or more of text, audio, picture, video, smell, light, augmented reality projection, temperature, humidity, and vibration. In an embodiment, the customized content may be, for example, a piece of text or voice message, and running the customized content when the trigger condition is met may be presenting or playing this piece of message. In another example, the customized content is a piece of specific audio, and running the customized content when the trigger condition is met includes playing this piece of customized audio. In yet another example, the customized content is a video. It can be understood that the video may include a two-dimensional video played on a certain medium, or a stereo video that can provide a stereoscopic effect, for example, a video with a stereoscopic effect formed by holographic imaging technology. In yet another embodiment, the customized content may also be characteristics such as colour, brightness, and turn-on time of light such as internal atmosphere light. In another embodiment, the customized content may also be a specific fragrance, the vehicle may include one or more fragrances, and the specific fragrance can be selected to be turned on under suitable conditions for a suitable period of time through customization. The customized content can also include setting a specific temperature, a specific humidity, or any vibration reminder, massage through the vehicle seat, and so on. In still other examples, the customized content may be an augmented reality projection superimposed on the currently displayed actual road surface or building. For example, the user can pre-set custom characters superimposed on the specific road, or custom characters superimposed on the building. In addition, in one or more embodiments, the user can also customize accessory features, such as a specific vehicle computer application program or turn on and turn off of vehicle accessories and the like. In this way, running the first customized content when the first trigger condition is met may also include: calling the application program or vehicle accessories by the vehicle computer to provide accessory features, including turning on a predetermined ambient light environment, turning on a predetermined fragrance, and so on. Of course, in one or more embodiments, the customized content of turning on or turning off vehicle accessories must comply with the driving safety settings. For example, the vehicle can only be allowed to set attachment settings that do not affect safe driving such as ambient lights, fragrance, air-conditioning temperature, cabin humidity, vehicle seat massage vibration, etc. The above are just non-limiting examples, and those skilled in the art can make modifications as needed.

In one or more embodiments, step 310 can be completed on a suitable device. In other words, providing the first customization option may include providing the first customization option in any one of the mobile device, the cloud, and the vehicle computer for the user to set. Specifically, in an embodiment, the user can operate through a software platform on their own mobile devices. An example of the software platform is Ford Pass. In one embodiment, the users mobile device can directly communicate with the vehicle computer to transmit the set first trigger condition and the first customized content to the vehicle computer. In another embodiment, the user can set the corresponding trigger condition and customized content through the mobile device, and then synchronize the trigger condition and customized content to the vehicle computer via the cloud. In another embodiment, the user can directly input the first trigger condition and the first customized content through the vehicle computer to complete the setting.

Continuing to refer to FIG. 3, after the user completes the customization, the vehicle enters the stage of detecting whether the set first trigger condition is met. The method 300 includes detecting whether the above-mentioned first trigger condition is met at step 315. For example, if the first trigger condition set by the user includes time, the vehicle computer or the mobile device that communicate with the vehicle computer can be used to monitor whether the set time has reached. If the first trigger condition set by the user includes trigger place, a vehicle positioning device or other suitable methods can be used to determine whether the set trigger place has reached. In other embodiments, when the set first trigger condition includes keywords, the keywords can be, for example, a piece of pre-set voice password, and the microphone in the vehicle collects the voice and further detect whether the keywords condition is triggered. In other embodiments, the keywords may also be one or more characters that need to be manually input, and the satisfaction of the first trigger condition can be determined when the one or more characters are imputed in the user search box or other program interface. In one or more embodiments, for the same keywords, different forms of trigger content may also be presented when different user voice characteristics are detected to increase interest.

In still other embodiments, the first trigger condition may also include object characteristics, which may mean that the first customized content targets to a specific object and therefore not any user entering the vehicle will trigger the related customized content. In such a case, the characteristics of the user existing in the current vehicle can be compared with the object characteristics in the customized situation to determine whether there is the desired target object. In some specific embodiments, the object characteristics may include voice characteristics, appearance characteristics, biometric identification (such as fingerprint authentication), or other characteristics that can be used to determine the existence of the specific object, such as the appearance of the user's known device in the vehicle and the completion of the pairing with the vehicle, or the way the user confirms. In other embodiments, the first trigger condition also includes environmental characteristics, for example, the user expects to send a message under good weather conditions, or he/she wants to customize a message to be sent on rainy days, or he/she expects to send a message when the road condition is relatively good. These can be combined with vehicle sensors or information from the cloud to determine conditions. Based on the one or more trigger conditions set above, when one or more of the first trigger conditions are not met, the method returns and continues to detect whether the first trigger condition is met.

Continuing to refer to FIG. 3, when the first trigger condition is met, next, the method proceeds to 320. At step 320, it is detected whether the target object is located in a driving position. In one or more embodiments, the seat occupancy condition can be detected through related seat sensors, sound sensors, etc. in the vehicle. In addition, with the users permission, the verification of user identity and the confirmation of related settings can also be carried out through the camera, etc. Or in another embodiment, the identity of the user can also be confirmed by confirming that the electronic device carried by the user appears or is paired with the vehicle. If the first trigger condition is met, inputs from the vehicle sensors confirm that only one user is in the driving position, then it is further confirmed whether the safe driving condition is met at 325. This can include determining whether the current vehicle is moving, whether it is waiting for traffic lights, the duration of the traffic lights, whether the vehicle is in a cruise mode or other semi-autonomous assistance mode, whether the vehicle is in an autonomous driving state, and whether the current road conditions include complex road sections and congestion degree etc. One or more safe driving conditions can be set by the user.

If the set safe driving conditions are met, the method can proceed further to 330. At this step 330, the user can be asked whether to run the first customized message. The inquiry form can be a voice inquiry or a text inquiry displayed on the display screen. When asking, simple sender information, type, and annotations can be provided for the user to confirm. Depending on the users confirmation, the method can proceed to the next step. If the user chooses no, or there is no reply, the default operation can be performed. Wait until the right time to ask again, such as when parking. For examples of micro-interactions, please refer to the applicant's Chinese patent application number 201510823521.1, in which the entire micro-interaction is postponed and the wait operation is executed until the micro-interaction is resumed at any suitable time, the entire content of which is quoted and incorporated here. In one or more embodiments, in addition, the settings of the related user may be further determined by the vehicle computer. For example, one or more users who customize the first customized content can set a privacy mode, in which content presentation, voice broadcast or text message display is only triggered when the intended recipient is alone in the vehicle. It is also possible for the specific object who receives the message to set the privacy mode by himself/herself, so that the customized content is only presented when the specific object is willing. These predetermined modes and settings can also be further used as detection conditions at the vehicle computer.

Next, at step 335, if the user agrees, the first customized content is run through the vehicle computer. Specifically, in one or more embodiments above, when the set first trigger condition or other safety conditions are all met, the first customized content can be run. For example, running the first customized content may include displaying a piece of text message through the display interface of the vehicle computer. For another example, running the first customized content can be invoking the speaker to play a piece of audio message. In another example, the vehicle computer can present a message combined with pictures and videos. In still other embodiments, the atmosphere can be additionally enhanced by turning on a specific ambient light in the vehicle. When there is a fragrance system in the vehicle, a specific smell can be set. On the premise of pre-setting the customizable functions, of course, it can also be adjusted in conjunction with other accessories, for example, but not limited to, the time when the air conditioner be turned on can be pre-set. If the vehicle is equipped with humidification equipment, the time period during which the humidifier remains on can be set, and the humidifier can also assist in playing video/audio or virtual holographic imaging. Based on one or more embodiments above, the vehicle computer can run certain customized content for the specific user under specific environmental conditions at the appropriate place and time desired by the user, so that the driving experience and life social experience can be further enriched under the premise of safety. On the one hand, through the personalized customization platform, different users are allowed to set the preferred vehicle settings before and during the journey in advance; on the other hand, by providing a personalized and customizable information interaction system, more diversified social needs can be met. Especially in the busy society, by providing a selectable personalized customization platform for vehicles, it is allowed to record meaningful events between family members and friends, and by setting up exclusive customized messages, that is triggered to be presented in a specific scenario, the user experience is improved. Subsequently, the method ends at 340.

It can be understood that one or more steps in the above-mentioned embodiment are not required, for example, before running the first customized content in step 335, the user may not be further asked whether to agree. In some embodiments, the first customized content may be classified into categories that can be run automatically and categories that need to be confirmed by the recipient and/or sender before running. In this embodiment, if the customized content is confirmed to belong to the predetermined category that can be run automatically, the customized content can be run directly. For another example, the position of the target object may not be additionally determined, and the customized content may be played when the driving condition is determined to be safe. In a specific embodiment, the user can pre-customize the following settings: for example, during commuting hours, when the vehicle is in a specific parking lot, to turn on the air conditioner at a predetermined time, to turn on the navigation at a predetermined time and plan a pre-set route, and to play specific music and so on. The user settings can be pre-stored as pre-set categories that can be run automatically, and one or more customized content can be run in a superimposed manner. Those skilled in the art can make one or more modifications without departing from the spirit of the present disclosure.

Figure 4:
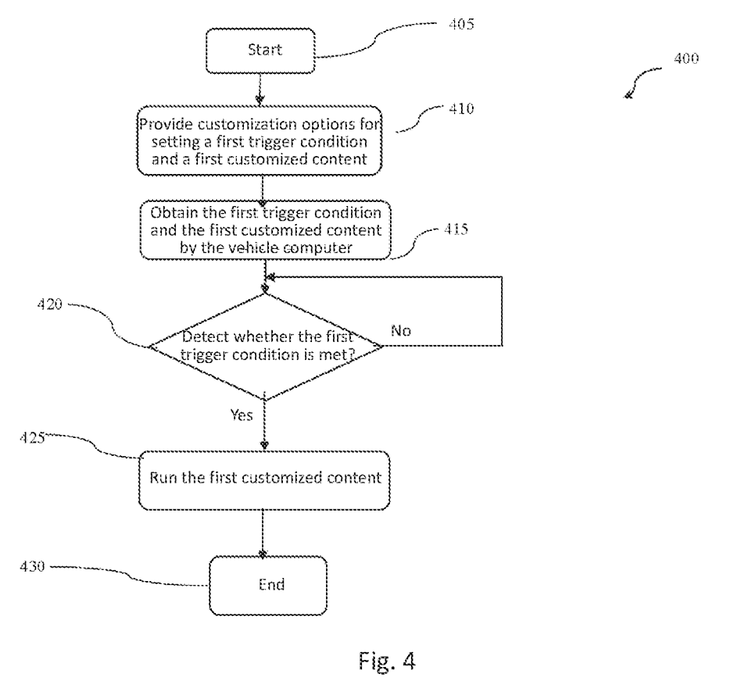
FIG. 4 shows a flowchart of a vehicle information interaction method according to another embodiment of the present disclosure.

Another embodiment of the present disclosure is shown in FIG. 4, which shows a flowchart 400 of the interaction method according to a specific embodiment. In the flowchart 400, compared to the method 300, one or more customization steps are omitted. Specifically, the method starts at 405. Next, at step 410, the user is provided with customization options for the user to set the first trigger condition and the first customized content. Setting the first trigger condition and the first customized content may be similar to step 310, and for the sake of brevity, details are not described herein again.

At step 415, the vehicle computer obtains the first trigger condition and the first customized content. This obtaining step can be divided into several situations. In an embodiment, the first trigger condition and the first customized content may be pre-set and pre-stored, such as holiday greetings from vehicle manufacturers, gift certificate customization and push from vehicle manufacturers, 4S stores or other service providers, etc, so that the vehicle computer can obtain the first trigger condition and the first customized content directly from the cloud/the storage device at the right time and at the right place. In an embodiment, the user directly operates at the vehicle computer, and the vehicle computer can obtain both the first customized content and the first trigger condition by directly receiving user input. In another embodiment, the user can set customization options through his/her mobile device. Subsequently, the vehicle computer directly obtains and caches both the first customized content and the first trigger condition from the users mobile device. Of course, in other embodiments, the mobile device or the vehicle computer can communicate via the cloud. In other words, the user can set the first customization options through the mobile device. This customization can be synchronized to the cloud, and the vehicle computer can obtain and cache both the first customized content and the first trigger condition through the cloud. Similarly, in one or more embodiments, the first trigger condition includes one or more of time, place, keywords, object characteristics, and environmental characteristics. The first customized content may include one or more of text, audio, picture, video, smell, light, augmented reality projection, temperature, and vibration.

It can be understood that, in one or more embodiments, since setting the first customization option can be done at different devices, obtaining the first customized content and the first trigger condition can be done either directly at the vehicle computer or via the mobile device or the cloud. In the time dimension, the above-mentioned obtaining of the first customized content and the first trigger condition can also be performed separately or simultaneously. For example, in an embodiment, the obtaining of the first customized content and the first trigger condition are simultaneously performed at the vehicle computer, that is, the user directly inputs the first customized content and the first trigger condition at the vehicle computer, so the first trigger condition is received at the same time as the first customized content is received through the vehicle computer. In another embodiment, the step of obtaining the first customization option includes completing the editing of the first customized content and the first trigger condition by receiving input at the mobile device carried by the user. Subsequently, the vehicle computer can receive both the first customized content and the first trigger condition directly from the mobile device or the cloud. In other embodiments, the first customization option can be customized through the mobile device first, and then the first trigger condition is received though the vehicle computer. When the first trigger condition is met, the vehicle computer obtains the first customized content from at least one of the mobile device and the cloud that communicate with the vehicle computer. In other words, when the vehicle computer detects that the first trigger condition is met, it will obtain the customized content to be presented from the appropriate platform or mobile device. This operation can eliminate the need for pre-storage of redundant content in the vehicle computer.

Next, as shown in the flowchart 400, at step 420, the method includes detecting whether the first trigger condition is met. In one or more embodiments, this detection step is also completed by the vehicle computer. For example, similar to step 315, when the set first trigger condition includes time, the vehicle computer can monitor whether the time has reached. When the set first trigger condition includes place, a vehicle positioning device or any suitable device can be used to determine whether the set place has reached. When the trigger condition also includes audio keywords, the microphone in the vehicle collects sound and further detects whether the keywords condition is triggered. As described above, it is possible to recognize the voice of different objects and display the first trigger content in different forms. For example, different displays can be set for male voices, female voices, and child voices to increase accuracy, privacy, and interest. In a specific embodiment, the user can customize options for his/her children, for example, by recording the children's audio passage as the trigger condition, and when the trigger condition is met by comparison, the corresponding customized content can be run, such as playing a specific learning audio/video, and when other people even mention similar keywords inadvertently, the corresponding first customized content may not be triggered. Those skilled in the art can make suitable modifications as needed. If one or more of the first trigger conditions are not met, the method returns and continues to detect whether the first trigger condition is met. Otherwise, the method proceeds to the next step.

Next, when it is confirmed that the first trigger condition is met, the method proceeds to step 425 to run the first customized content. In one or more embodiments, running may include operations such as calling programs, presenting pictures and texts, playing video and sound, and starting programs or accessories. As described in the above embodiment, running the first customized content may include displaying a piece of text information through the display interface of the vehicle computer. For another example, running the first customized content may include playing a piece of audio message by invoking the speaker. In another example, the vehicle computer can present a message combined with pictures and videos through the screen 4. In still other embodiments, running the first customized content may include setting the temperature, turning on a specific function or program and so on, turning on the specific ambient light in the vehicle to enhance the atmosphere, and setting a specific smell when there is a fragrance system in the vehicle. Subsequently, the method ends at 430.

Figure 5:
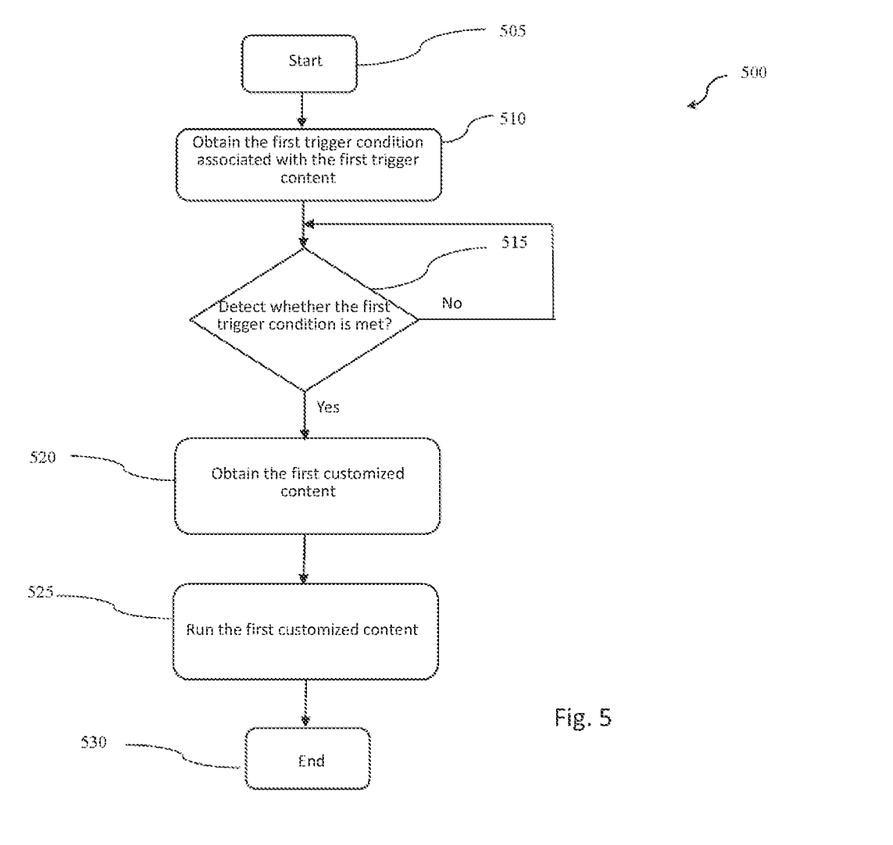
FIG. 5 shows a flowchart of a vehicle information interaction method according to yet another embodiment of the present disclosure.

Continuing to refer to FIG. 5, a flowchart 500 of the interaction method according to a specific embodiment is shown. In the flowchart 500, compared to the method 400, one or more customization steps are omitted or changed. Specifically, the method starts at 505.

Next, at step 510, the vehicle computer obtains the first trigger condition associated with the first customized content. At this time, the vehicle computer only obtains, for example, the trigger condition. For example, a specific example is that the vehicle computer learns that the first customized content needs to be triggered when the time is a holiday and the place is a certain road. What the first customized content specifically refers to is not yet known. This obtaining step can be divided into several situations. As described in step 415 above, if the user performs customization, he/she can directly operate at the vehicle computer, and the vehicle computer directly obtains the first trigger condition associated with the first trigger content by receiving user input. In another embodiment, the user can set customization options through his/her mobile device. Then, the vehicle computer obtains and caches the first trigger condition associated with the first trigger content directly from the users mobile device. Of course, in other embodiments, the mobile device or the vehicle computer can communicate via the cloud. In other words, the first customization option can be set through the mobile device. This customization can be synchronized to the cloud, and the vehicle computer can obtain and cache the first trigger condition associated with the first trigger content via the cloud. In one or more embodiments, similarly, the first trigger condition includes one or more of time, place, keywords, object characteristics, and environmental characteristics. The first customized content may include one or more of text, audio, picture, video, smell, light, augmented reality projection, temperature, humidity, and vibration.

At step 515, the method includes detecting whether the first trigger condition is met. In one or more embodiments, this detection step is completed by the vehicle computer. For example, similar to step 315, when the set first trigger condition includes time, the vehicle computer can monitor whether the time has reached. When the set first trigger condition includes place, the vehicle positioning device or any suitable device can be used to determine whether the set place has reached. When the trigger condition also includes audio keywords, the microphone in the vehicle collects sound and further detects whether the keywords condition is triggered. When the set first trigger condition includes environmental characteristics, such as road conditions, weather conditions, etc., related information can also be obtained through one or more sensors in the vehicle to confirm whether the trigger condition is met. Those skilled in the art can make suitable modifications as needed. If one or more of the first trigger conditions are not met, the method returns and continues to detect whether the first trigger conditions are met. Otherwise, the method proceeds to the next step.

Next, when it is confirmed that the first trigger condition is met, the method proceeds to step 520 to obtain the first customized content. The vehicle computer can retrieve the first customized content associated with the first trigger condition, for example, in the vehicle computer storage device, the cloud, or the mobile device, to obtain the first customized content. If there are multiple customized content associated with the first trigger condition, they can be run in a certain order. If they do not interfere with each other, they can be run at the same time, or the running order can be in the order of receipt or in any order desired by the user, for example, the user can choose to postpone or advance the play of one of the messages. In one or more embodiments, there may be such a situation: for example, the user sets the first customization option for himself/herself, and other user also provides the second customization option for the user. If the two do not conflict, they can be run in a superimposed manner. If there is a conflict between the two, the user can be reminded of the conflict and asked whether he is willing to switch the setting options. When the user is a child, the settings made by the guardian for him can also be set to have a higher priority. In one or more embodiments, running may include operations such as calling programs, presenting pictures and texts, playing video and sound, and starting programs or accessories. As described in the above embodiment, running the first customized content may include displaying a piece of text information through the display interface of the vehicle computer. For another example, running the first customized content can include playing a piece of audio message by invoking the speaker. In another example, the vehicle computer can present a message combined with pictures and videos through the screen 4. In still other embodiments, running the first customized content may include turning on the specific ambient light in the vehicle to enhance the atmosphere, and setting a specific smell when there is a fragrance system in the vehicle. On the premise of pre-setting the customizable functions, of course, it can also be adjusted in conjunction with other accessories. Subsequently, the method ends at 530.

In one or more embodiments according to the present disclosure, the customization option provided to the user may exist as a module option in the existing platform, such as the aforementioned Ford Sync system, or Ford Pass. For example, when the Ford Pass is opened, there is a "customization message" tab. By clicking the tab, the user can select the first trigger condition and one or more customized content. For example, the user can set to call the air conditioning control program to adjust to 26 degrees Celsius before 7 o'clock in such a triggering situation: during the commuting time (specifically from 7 to 8 o'clock), when the vehicle is located in the geographic location of the home or parking lot, and the weather temperature is high or below a specific temperature, to run the vehicle computer navigation at 7:30 to plan a specific navigation route, to play songs after the user enters the vehicle from 8 o'clock, to switch to learning audio at 8:30 and so on. Of course, in other embodiments, the customization options themselves can also exist as a separate applet, for example, it can be a program provided on the vehicle computer platform, from which the user can customize the first trigger condition and the first customized content. In other embodiments, these functions can also be provided in combination with programs provided by the vehicle computer.

One or more solutions according to the present disclosure provide users with a more personalized interaction platform. In an example, a family vehicle may allow more than two persons to set permissions, allowing the user to customize the desired vehicle settings, the time period when the function is turned on, and the running mode and time of the applet for themselves. In addition, the users are allowed to provide customized messages to each other. For example, a commemorative scene is recorded during a trip and can be pre-set by the user, and the next time the route passes through this scene, a message is sent to oneself or others, the content of which can be the last recorded scene picture, text message, etc. When the scene is passed the next time, if all other pre-set conditions are met, the relevant picture or text message or other types of auxiliary settings set during the previous pass of the scene can be triggered. In a specific example, for example, related messages for enhanced display can also be projected on, for example, the current navigation interface, the head-up display, or even the current windshield. For example, the message is displayed in a way that it is superimposed on the area of the current navigation interface that does not affect the display of the navigation route. The virtual message can also be displayed in a way that is superimposed on the passing building area. For another example, under the premise of ensuring safety and meeting the trigger conditions, customized songs pushed by a partner or friend can be automatically presented or played on the vehicle computer at a specific time and scene. By providing a personalized and customizable information interaction system, more diversified personalized use needs and social needs can be met. Where it is technically possible, the technical features listed in relation to different embodiments can be combined with each other to form further embodiment within the scope of the present disclosure.

Those skilled in the art should understand that the implementations of the systems, equipment, devices, and methods disclosed herein may comprise or utilize an on-board or off-board special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

The implementations of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions comprise, for example, instructions and data which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-mentioned embodiments are possible examples of implementations of the present disclosure and are given only for the purpose of enabling those skilled in the art to clearly understand the principles of the invention. It should be understood by those skilled in the art that the above discussion to any embodiment is only illustrative, and is not intended to imply that the disclosed scope of the embodiments of the present disclosure (including claims) is limited to these examples; under the overall concept of the invention, the technical features in the above embodiments or different embodiments can be combined with each other to produce many other changes in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

The invention claimed is:

1. An information interaction system for a vehicle, comprising:
an information processing device including a processor and a memory, the memory storing instructions executable by the processor, that, when executed by the processor, cause the latter to perform steps comprising:
either transferring first data from a mobile device or a cloud to a vehicle computer, or inputting the first data directly into the vehicle computer, the first data comprising first trigger data, first customized content data, second trigger data different than the first trigger data, and second customized content data different than the first customized content data, wherein the first trigger data includes a first time and a first location, and wherein the second trigger data includes a second time and a second location, wherein the first customized content includes a first audio, video and/or text message, a first ambient lighting, and a first fragrance, and wherein the second customized content includes a second audio, video and/or text message, a second ambient lighting, and a second fragrance;
detecting sixth data with the vehicle computer;
running the first customized content data by the vehicle computer when the sixth data matches the first trigger data in order to provide a first driving experience customized for a first user, and running the second customized content data by the vehicle computer when the sixth data matches the second trigger data in order to provide a second driving experience customized for a second user different than the first user, wherein running the first customized content data includes calling a vehicle computer application program, and presenting the first audio, video and/or text message, the first ambient lighting, and the first fragrance, and wherein running the second customized content data includes calling the vehicle computer application program, and presenting the second audio, video and/or text message, the second ambient lighting, and the second fragrance; and
confirming, with a seat sensor of the vehicle, whether an object targeted by the first customized content data and second customized content data is in a driving position before running the first customized content data and second customized content data.

2. The information interaction system according to claim 1, wherein the first trigger data and second trigger data includes keywords in the form of pre-set voice passwords.

3. The information interaction system according to claim 1, wherein the first trigger data and second trigger data are each place and the information processing device is configured to communicate with a vehicle positioning system to detect whether the place has reached.

4. The information interaction system according to claim 1, wherein the first trigger data and second trigger data includes object characteristics and the information processing device is configured to receive signals from vehicle sensors, and detect one or more of electronic devices paired with or communicated with the vehicle and user input to confirm whether the object characteristics are met.

5. The information interaction system according to claim 1, wherein the steps comprises further asking the user to confirm whether to run the first customized content data and second customized content data before running the first customized content data and second customized content data, respectively.

6. The information interaction system according to claim 1, wherein the steps comprises further confirming whether the first customized content data and second customized content data belongs to a pre-set category configured to run automatically before running the first customized content data and second customized content data in order to cause the message to be run by the vehicle.

7. The information interaction system according to claim 1, wherein either transferring first data from the mobile device or the cloud to the vehicle computer, or inputting the first data directly into the vehicle computer, is transferring the first data from the mobile device to the vehicle computer.

8. The information interaction system according to claim 1, wherein either transferring first data from the mobile device or the cloud to the vehicle computer, or inputting the first data directly into the vehicle computer, is transferring the first data from the cloud to the vehicle computer.

9. The information interaction system according to claim 1, wherein either transferring first data from the mobile device or the cloud to the vehicle computer, or inputting the first data directly into the vehicle computer, is inputting the first data directly into the vehicle computer.

10. The information interaction system according to claim 1, further comprising detecting the first user with a sensor of the vehicle before running the first customized content data, and detecting the second user with the sensor before running the second customized content data.

11. The information interaction system according to claim 1, wherein the first data further comprises seventh data different than the first trigger data and second trigger data, and eighth data different than the first customized content data and second customized content data, wherein the steps further comprise, running the eighth data by the vehicle computer when the sixth data matches the seventh data in order to provide a third driving experience customized for a third user, and wherein each of the first trigger data, second trigger data, and seventh data include keywords in the form of pre-set voice passwords.

12. The information interaction system according to claim 1, wherein presenting the message superimposed in the user's field of vision by augmented reality is on the one or more side windows of the vehicle.

13. An information interaction method for a vehicle, comprising the following steps:
either transferring first data from a mobile device or a cloud to a vehicle computer, or inputting the first data directly into the vehicle computer, the first data comprising first trigger data, first customized content data, second trigger data different than the first trigger data, and second customized content data different than the first customized content data, wherein the first trigger data includes a first time and a first location, and wherein the second trigger data includes a second time and a second location, wherein the first customized content includes a first audio, video and/or text message, a first ambient lighting, and a first fragrance, and wherein the second customized content includes a second audio, video and/or text message, a second ambient lighting, and a second fragrance;
detecting sixth data with the vehicle computer; and
running the first customized content data by the vehicle computer when the sixth data matches the first trigger data in order to provide a first driving experience customized for a first user, and running the second customized content data by the vehicle computer when the sixth data matches the second trigger data in order to provide a second driving experience customized for a second user different than the first user, wherein running the first customized content data includes calling a vehicle computer application program, and presenting the first audio, video and/or text message, the first ambient lighting, and the first fragrance, and wherein running the second customized content data includes calling the vehicle computer application program, and presenting the second audio, video and/or text message, the second ambient lighting, and the second fragrance, and
confirming, with a seat sensor of the vehicle, whether an object targeted by the first customized content data and second customized content data is in a driving position before running the first customized content data and second customized content data.

14. The information interaction method according to claim 13, wherein the first trigger data and second trigger data include keywords in the form of pre-set voice passwords.

15. The information interaction method according to claim 13, wherein the first trigger data and second trigger data each include at least object characteristics, and the information processing device receives signals from vehicle sensors and/or user input to confirm whether the object characteristics are met.

16. The information interaction method according to claim 13, wherein the steps includes receiving and caching both the first customized content data and second customized content data and the first trigger data and second trigger data by the vehicle computer.

17. The information interaction method according to claim 13, further comprising confirming whether the first customized content data and second customized content data belongs to a pre-set category configured to run automatically before running the first customized content data and second customized content data in order to cause the message to be run by the vehicle.

* * * * *